United States Patent
Richmond

[15] 3,665,069
[45] May 23, 1972

[54] METHOD OF MAKING POWER TRANSMISSION BELTS

[72] Inventor: Kenneth D. Richmond, Nixa, Mo.

[73] Assignee: Dayco Corporation, Dayton, Ohio

[22] Filed: Feb. 13, 1970

[21] Appl. No.: 11,158

[52] U.S. Cl..............................264/219, 264/262, 264/297, 264/328
[51] Int. Cl........................................................B29c 1/16
[58] Field of Search..................264/328, 297, 261, 262, 277, 264/219

[56] References Cited

UNITED STATES PATENTS

| | | | |
|---|---|---|---|
| 3,164,026 | 1/1965 | Terhune | 74/233 |
| 3,482,004 | 12/1969 | Anderson | 264/25 |
| 2,351,329 | 6/1949 | Gerstenmaier | 264/262 X |
| 1,932,548 | 10/1933 | Ingwer | 264/297 |
| 2,254,233 | 9/1941 | Meyer | 18/30 |
| 2,456,580 | 12/1948 | Carter | 18/59 |
| 2,832,996 | 5/1958 | Loftis | 18/42 |
| 3,559,249 | 2/1971 | Patton | 264/328 X |
| 3,579,799 | 5/1971 | Furstenburg | 264/219 |

FOREIGN PATENTS OR APPLICATIONS 1,452,813   8/1966   France..................264/328

Primary Examiner—Robert F. White
Assistant Examiner—Richard R. Kucia
Attorney—Reuben Wolk

[57] ABSTRACT

A plurality of individual power transmission belts are made in a simultaneous manner utilizing the method of this invention while making full use of standard injection molding equipment. The method employs an apparatus comprised of a lower structure and an upper structure suitably fastened together and having cooperating surface means which define a plurality of annular cavities with each cavity defining an associated belt. The cavities are supplied from a common sprue and the plurality of belts are formed by the simultaneous injection of elastomeric material into such cavities and then curing and cooling the material to define the transmission belts.

9 Claims, 10 Drawing Figures

Patented May 23, 1972
3,665,069
2 Sheets-Sheet 1
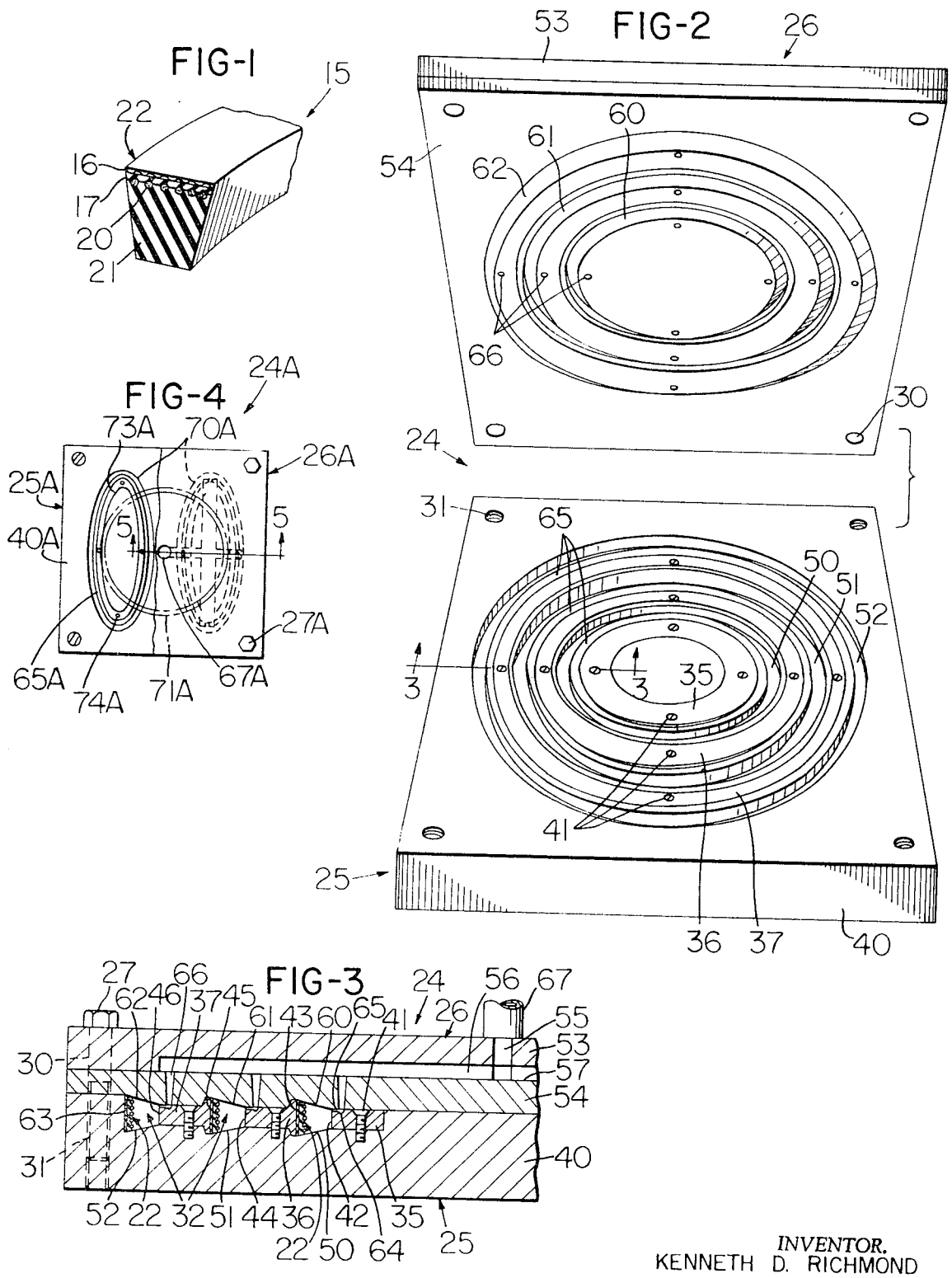
INVENTOR.
KENNETH D. RICHMOND
BY Reuben Wolk
ATTORNEY Patented May 23, 1972
3,665,069
2 Sheets-Sheet 2
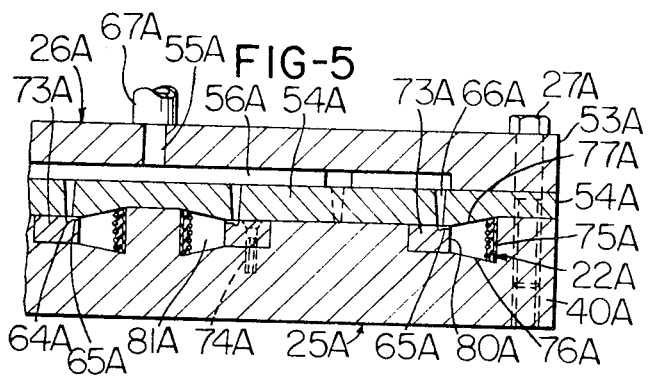
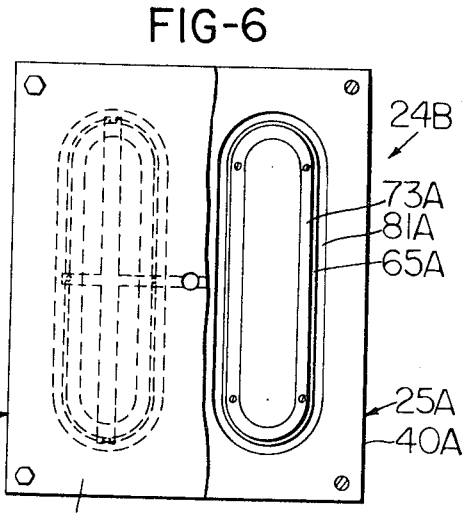
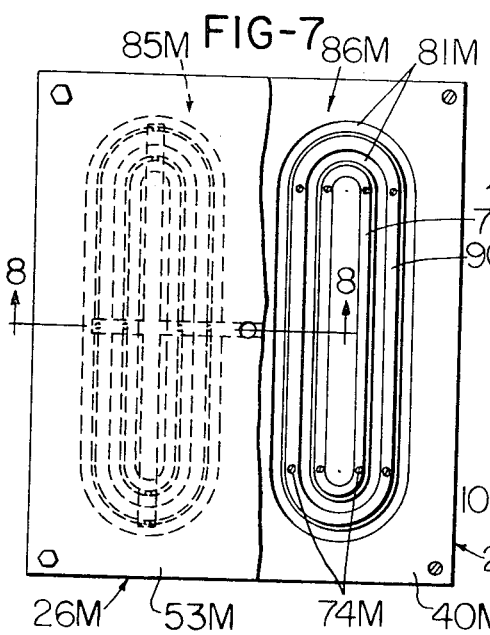
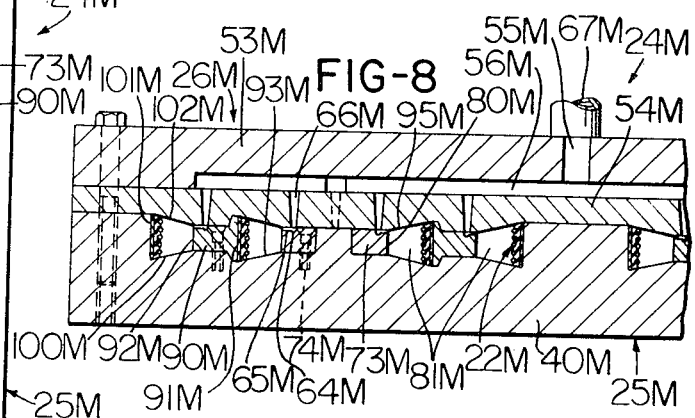
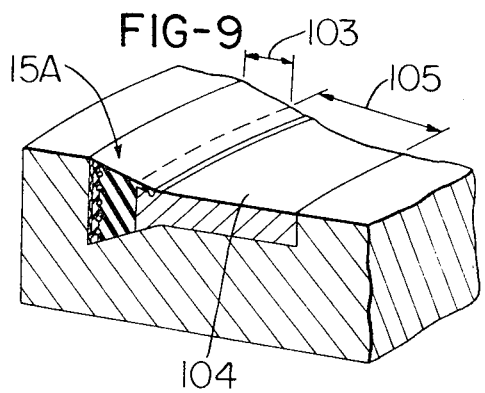
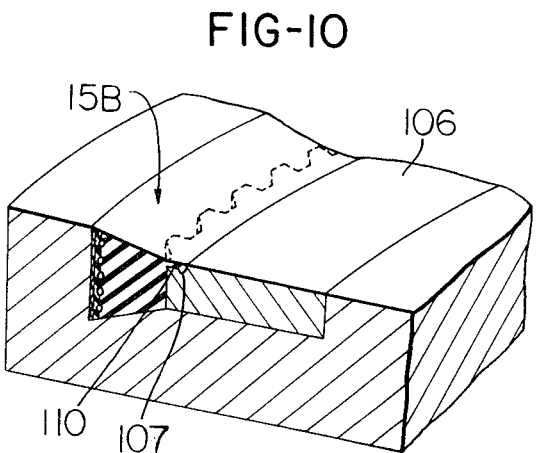
INVENTOR.
KENNETH D. RICHMOND
BY
Reuben Wolk
ATTORNEY

METHOD OF MAKING POWER TRANSMISSION BELTS

BACKGROUND OF THE INVENTION

The power transmission belts, such as V-belts, in present use are generally either formed one at a time in an associated apparatus or in those instances where a plurality of belts are made in a simultaneous manner the plurality of belts are usually made as one elongated tubular member known in the art as a "sleeve" which must then be cut to define individual V-belts whereby the various operations required in making belts in this manner are complicated, time consuming, and result in expensive V-belts. It has also been proposed that elongated sleeves of the character mentioned be made by injection molding; however this technique requires the use of a precisely made single cavity mold which is located in an expensive injection molding press. Further, each of these injection molded sleeves must then be precisely cut to define a plurality of individual V-belts whereby the belts formed in this manner are also very expensive and not of optimum quality.

SUMMARY

This invention provides an improved method of making a plurality of individual power transmission belts, such as V-belts, in a simultaneous manner by injection molding so as to define belts of optimum quality and structural strength which do not vary from one belt to the next. The plurality of belts are formed utilizing a lower structure and an upper structure which are suitably fastened together and have cooperating surface means provided therein which define a plurality of annular cavities each defining an associated belt. The cooperating surface means may be easily modified to define belts of standard configuration, thin belts, or toothed belts, for example.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a fragmentary perspective view with parts in cross section illustrating an exemplary endless power transmission belt made by the method of this invention;

FIG. 2 is a perspective view of an exemplary apparatus used to simultaneously form a plurality of three belts of different sizes and each having a cross-sectional configuration similar to the cross-sectional configuration of the exemplary belt illustrated in FIG. 1;

FIG. 3 is an enlarged fragmentary cross-sectional view taken essentially on the line 3—3 of FIG. 2 and with the top structure assembled in position;

FIG. 4 is a plan view illustrating another exemplary embodiment of an apparatus utilized to make a plurality of two belts in side-by-side relation in accordance with this invention and showing roughly half of the top structure of such mold broken away;

FIG. 5 is an enlarged fragmentary cross-sectional view taken essentially on the line 5—5 of FIG. 4;

FIG. 6 is a plan view of another exemplary apparatus employed in the method of this invention and such apparatus is similar to the apparatus of FIG. 4 and showing roughly half of the top structure comprising such apparatus broken away;

FIG. 7 is a view similar to FIG. 6 illustrating another exemplary embodiment of an apparatus employed in the method of this invention and used to form a plurality of belts in a plurality of sets with each set having a plurality of concentric annular cavities defining a corresponding plurality of power transmission belts;

FIG. 8 is an enlarged fragmentary cross-sectional view taken essentially on the line 8—8 of FIG. 7;

FIG. 9 is a fragmentary perspective view illustrating an annular ring which may be used in any one of the apparatus of FIGS. 2, 4, 6, or 7 to define a belt of comparatively small thickness; and FIG. 10 is a fragmentary perspective view similar to FIG. 9 and illustrating an annular ring which may be used in any of the illustrated apparatus to define a belt having a toothed configuration in its compression section.

DESCRIPTION OF ILLUSTRATED EMBODIMENTS

Reference is now made to FIG. 1 of the drawings, which illustrates a fragmentary portion of an exemplary power transmission belt 15 made using the method of this invention. The belt 15 comprises an outer fabric cover 16; a tension section 17 adjoining and being bonded to the cover 16, with the tension section 17 being defined by a gum material having high resiliency; a load-carrying section comprised of a load-carrying cord 20 which adjoins the tension section 17 and is partially embedded therein; and a compression section 21 made by injection molding and utilizing the method of this invention and in a manner to be described in detail subsequently. The fabric cover 16, tension 17, and load-carrying cord 20 may be preformed as a unit or outer section using any suitable known technique and such outer section will be designated generally by the reference numeral 22.

The belt 15 may be made using any one of the various exemplary apparatus to be describe hereinafter; and the detailed description will proceed by first describing the apparatus 24 shown in FIGS. 2 and 3 of the drawings. The apparatus or mold 24 comprises a lower structure 25 and an upper structure 26 which are held together using any suitable fastening device and for ease of presentation in this example of the invention, the structures are shown held together by a plurality of threaded bolts 27 each extending through an opening 30 in the upper structure 26 and being threadedly fastened in a threaded opening 31 in the lower structure 25. The threaded bolts 27 serve the dual purpose of holding structures 25 and 26 together and precisely aligning such structures to assure the precision simultaneous forming of a plurality of power transmission belts similar to the belt 15.

The mold 24 has cooperating surface means provided in its structures 25 and 26 which define a plurality of three annular cavities having substantially identical cross-sectional configurations and different lengths. For convenience and ease of presentation, each cavity will be designated by the reference numeral 32 and defines an associated belt upon injecting an elastomeric material therewithin in the manner to be subsequently described.

The lower structure 25 has a plurality of three annular rings of circular outline and such rings are designated by the reference numerals 35, 36, and 37. Each ring 35–37 of this example is suitably fixed to a lower member 40 comprising the lower structure 25 by a plurality of threaded screws 41 whereby each of such rings is readily removable.

Each ring 35–37 has at least one surface thereof defining a wall or surface of an associated cavity 32. In particular, ring 35 has an outer surface 42 defining one wall of the inner cavity 32, ring 36 has an inner surface 43 defining an opposite wall of the inner cavity 32 and has an outer surface 44 which defines a wall of the center cavity 32, and ring 37 has an inner surface 45 arranged opposite surface 44 and defining an opposed wall of the center cavity 32 and has an outer surface 46 defining the inner wall of the outer cavity 32.

The lowe member 40 of lower structure 25 has a plurality of spaced inclined annular surfaces 50, 51, 52, each defining a lower wall of an associated annular cavity 32 and such surfaces are concentrically arranged in spaced relation. The manner in which surfaces 50–52 cooperate with associated rings 35–37 and associated surfaces of upper structure 26 will be described in detail subsequently.

The upper structure 26 is comprised of an outer member 53 adjoined by a member 54 which is normally sandwiched between members 40 and 53 are held in position by the threaded bolts 27. The member 53 has a central sprue 55 and a plurality of radial grooves 56 formed therein which communicate with the sprue 55 and upon installing members 53 and 54 together the grooves 56 cooperate with the top surface 57 of member 54 to define radial runners and for convenience such radial runners will also be referred to as runners 56.

The member 54 has an outer surface which is provided with a plurality of inclined annular surfaces 60, 61, and 62 which are concentrically arranged in spaced relation. The surface 60 cooperates with surfaces 42, 50, and 43 to define the inner annular cavity 32; surface 61 cooperates with surfaces 44, 51, and 45 to define the center annular cavity 32; and surface 62 cooperates with surfaces 46, 52, and a cylindrical surface 63 provided in member 40 to define the outer cavity 32.

The mold 24 has passage means for flowing elastomeric material in each mold cavity and such passage means comprise a plurality of annular runners each associating with a particular mold cavity 32 provided in the lower structure 25 and for convenience each annular runner will be designated by the reference numeral 64. The mold 24 also has a plurality of annular slits 65 each placing an associated groove or runner 64 in fluid flow communication with am associated annular cavity 32. Each slit 65 is provided by cutting an annular strip from the outer top portion of an associated annular ring 35–37 which extends from an annular runner 64 to its associated outside surface 42, 44, and 46 respectively for rings 35, 36, and 37.

The mold 24 also has a plurality of interconnecting vertical channels 66 provided in member 54 of its lower structure 25 and each channel 66 connects a radial runner 56 with an associated annular runner 64 and its slit 65. Thus, it is seen that flow of elastomeric material is provided through sprue 55, radial runners 56, vertical channels 66 annular runners 64, and slits 65 to simultaneously fill the three annular cavities 32 after placing outer sections 22 in position to simultaneously define a plurality of three belts 15 having substantially identical cross-sectional configurations and different lengths. The sprue 55 may be supplied with elastomeric material from any suitable source through a conduit 67, as seen in FIG. 3.

After elastomeric material has been injected into the mold cavities 32 such material is suitably cured and cooled using any known technique and the three belts 15 are removed from the mold 24. Each belt 15 will have flash material adjoining a corner of its compression section 21 and such flash material is comprised of the material present in the annular runner 64 and slit means 65 of the particular belt prior to removal of such belt from the mold 24. The flash material is trimmed using any suitable technique and trimming device.

In this example of the invention the elastomeric material is injected into each cavity 32 through annular slits which enter a corner of the mold cavity throughout its entire peripheral outline. However, it will be appreciated that the passage means in mold 24 may be such that flow of elastomeric material may be introduced into the mold cavities at locations other than the corners thereof. In addition, flow may be provided into each mold cavity through a plurality of spaced passages to thereby simultaneously form a plurality of individual power transmission belts of optimum quality.

Another exemplary embodiment of an apparatus which may be used in carrying out the method of this invention is illustrated in FIGS. 4 and 5 of the drawings. The apparatus illustrated in FIGS. 4 and 5 is very similar to the apparatus 24; therefore, such apparatus will be designated generally by the reference numeral 24A and parts of the apparatus 24A which are very similar to corresponding parts of the apparatus 24 will be designated by the same reference numeral as the apparatus 24, also followed by the letter designation "A" and not described again. Only those component parts which are substantially different from corresponding parts of the apparatus 24 will be designated by a new reference numeral, also followed by the letter designation "A" and described in detail.

The main difference between the apparatus 24 and the apparatus 24A is that the apparatus 24A instead of having a plurality of concentric annular cavities provided therein for the forming of a corresponding plurality of transmission belts having different sizes, i.e., perpheral outlines or lengths, provides for the forming of a plurality of two equal length transmission belts in side-by-side relation and such transmission belts are formed so that each has an oval configuration as illustrated at 70A. By forming each transmission belt so that it has an oval configuration it is possible to provide a plurality of two belts, for example, approximately within the volume or space which would normally be utilized to define a single belt of the same size and to a circular configuration and this fact is highlighted by the circular dotted lines shown at 71A in FIG. 4.

The mold 24A has a lower structure 25A comprised of a lower member 40A and a plurality of identical annular rings 73A each fastened in position by a plurality of fastening screws 74A. The member 40A has a pair of cylindrical surfaces 75A of oval outline and each surface 75A is adjoined by an inclined annular surface 76A provided in member 40A.

The intermediate member 54A of the upper structure 26A of mold 24A also has a plurality of two inclined annular surfaces 77A formed therein. A set of surfaces 75A, 76A, and 77A cooperate with the outside surface 80A of an associated readily detachable annular ring 73A to define an annular cavity 81A within which a power transmission belt is made by injection molding and such belt is substantially identical to the belt 15 with the exception that it is initially formed by mold 24A in oval form. However, once the elastomeric material injected into each cavity 81A has been suitably cured and cooled and the resulting belt removed from its mold, it will have circular form.

Elastomeric material is introduced into the sprue 55A of mold 24A through a conduit 67A whereupon such material flows through runners 56A, interconnecting channels 66A, annular runners 64A, and annular slits 65A into the cavities 81A. Thus, a plurality of two individual belts of equal length may be formed in a simultaneous manner by injection molding in the mold 24A in a similar manner as described for belts of different lengths formed in the mold 24.

A modification of the mold 24A is illustrated in FIG. 6 and therefore such modification will be designated by the reference numeral 24B. The main difference between the mold 24B and the mold 24A is that the cooperating surface means provided in the mold 24B are such that each of the two annular cavities 81A has side portions which are arranged in parallel relation. With this exception, the remainder of the mold of FIG. 6 is identical to the mold of FIGS. 4 and 5 whereby component portions thereof are designated by the same reference numerals as in the mold 24A and a detailed description of the mold 24B will not be made, it being understood that reference may be made to the previous description of mold 24A for an understanding of the detailed construction of the mold 24B. The arrangement of side portions of each cavity 81A in parallel relation enables forming a plurality of belts 15 of equal length in a mold having a smaller width.

Another exemplary embodiment of an apparatus which may be used in carrying out the method of this invention is illustrated in FIGS. 7 and 8 of the drawings. The mold illustrated in FIGS. 7 and 8 is very similar to the mold 24A; therefore, such mold will be designated generally by the reference numeral 24M and parts of the mold 24M which are very similar to corresponding parts of the mold 24A will be designated by the same numeral as in the mold 24A also followed by the letter designation "M" and not described again. Only those component parts which are substantially different from corresponding parts of the mold 24A will be designated by a new reference numeral also followed by the letter designation "M" and described in detail.

The mold 24M is comprised of a lower structure 25M and an upper structure 26M; however, the annular mold cavities 81M defined in the mold 24M comprise a plurality of two sets of oval cavities as illustrated at 85M and at 86M in FIG. 7. Each set 85M and 86M has a plurality of oval cavities 81M arranged therein in a substantially concentri manner whereby the advantages of being able to define a plurality of cavities in a mold of given size as illustrated in connection with the apparatus 24A are combined with the advantages of utilizing a mold similar to the mold 24 having concentric cavities to thereby provide the best features of both structures.

The lower structure 25M of the mold 24M is comprised of a pair of annular rings 73M suitably held in position by fastening screws 74M and a plurality of rings 90M also held in position by screws 74M. The rings 90M are similar in function to the rings 36 and 37 comprising the mold 24. Each ring 90M has opposed surfaces 91M and 92M with inside surface 91M cooperating with an inclined surface 93M of member 40M, an outer surface 80M of ring 73M, and inclined annular surface 95M of member 54M to define the inner mold cavity 81M of each set, either set 85M or 86M. The outside surface 92M of ring 90M cooperates with an inclined annular surface 100M and an adjoining cylindrical surface 101M of oval outline in member 40M together with an inclined surface 102M in member 54M to define the outer mold cavity 81M of each set 85M or 86M.

As previously an elastomeric material is introduced into mold 24M through a common sprue 55M. Each cavity 81M is supplied by an annular slit 65M which communicates with an annular runner 64M which in turn communicates with an associated interconnecting passage 66M and a substantially radial runner 56M. Thus, elastomeric material is introduced into each cavity 81M in a simultaneous manner to enable filling both sets 85M and 86M of cavities 81M to thereby individually form a plurality of high quality belts 15 in a simultaneous manner.

Each belt 15 formed in the mold 24M has an outer section 22M which is placed in position in an associated mold cavity 81M in a similar manner as previously described in connection with mold 24; therefore, such description will not be repeated.

The power transmission belts formed utilizing the apparatus or molds 24, 24A, or 24M may be considered as being belts of standard thickness; however, it will be appreciated that the technique of this invention may be utilized to form what may be considered thin belts or belts each having a reduced vertical thickness as indicated at 103 in FIG. 9. This may be achieved either by utilizing an annular ring 104 for each thin belt 15A which is similar to the corresponding rings of the previously described molds but having a radial thickness 105 which is greater than the corresponding thickness for a ring used to make a standard belt. It will also be appreciated that the various surfaces of a ring 104 for a thin belt may be comprised of a plurality of cooperating annular sections one of which may be the ring used to form a V-belt of standard size and with suitable cooperating passage means provided in such annular sections to enable injection of the elastomeric material into the mold cavity.

The method of this invention may also be used to define a plurality of toothed belts and for this purpose a plurality of rings similar to the ring 106 illustrated in FIG. 10 may be provided, with each ring 106 being fully interchangeable with a standard ring provided in an associated mold. Each ring 106 preferably has means for placing the outer portion thereof in fluid flow communication with its associated annular mold cavity. Preferably, each ring 106 has an annular runner 107 provided with radial openings 110 which place the runner 107 in communication with the crest of each tooth of an associated toothed belt 15B. Thus, not only is the method of this invention applicable to the simultaneous forming of a plurality of individual belts of standard construction, but such method is fully applicable to forming toothed belts as well as what may be considered thin belts.

The belts 15, 15A, and 15B are shown as being formed in what may be considered their normal positions and cooperating surface means have been provided in each mold to enable forming such belts in their normal positions. However, it will be appreciated that the method of this invention is fully applicable to the forming of belts by injection molding and in their inverted positions. Thus, after suitably curing and cooling belts formed in their inverted positions, each belt would be trimmed of flash material, inverted, and utilized in the normal manner.

In this disclosure, only the compression section of each belt is formed by injection molding. After the outer section (comprised of an outer fabric, a tension section, and a load-carrying cord) has been placed in position in its associated mold cavity. However, it will be appreciated that the technique of this invention is fully applicable when the entire belt cross sections of a plurality of belts are formed by injection molding.

To assure easy understanding of this invention, the disclosure presents that the mold halves are held together by bolts. However, it is to be understood that in normal practice the mold halves are positioned in a press with the illustrated bolts replaced by centering pins. These pins align the mold as the press closes and the clamping force which holds the mold halves together comes from the injection press itself.

While present exemplary methods of practicing this invention, have been illustrated and described, it will be recognized that this invention may be otherwise practiced within the scope of the following claims.

What is claimed is:

1. A method of simultaneously making a plurality of individual power transmission belts comprising the steps of forming a plurality of annular mold cavities in a mold comprised of an upper structure fastened to a lower structure by detachably fastening a plurality of annular rings in said mold corresponding in number to the number of cavities in said mold, each of said rings having at least one surface which defines a corresponding wall of an associated mold cavity, placing an annular insert in each mold cavity, each insert having an integral load-carrying portion and defining a corresponding outer section in its associated belt, injecting an elastomeric material in a simultaneous manner into said plurality of mold cavities by injecting through radial runners, and curing and cooling said elastomeric material to define said plurality of belts.

2. A method as set forth in claim 1 in which said injecting step comprises injecting said elastomeric material into said mold cavities using a plurality of annular runners corresponding in number to said plurality of mold cavities, each of said annular runners being in flow communication with an associated mold cavity and said radial runners.

3. A method as set forth in claim 1 in which said step of detachably fastening comprises fastening at least one ring in said mold having an increased radial thickness which enables forming an associated belt which is thinner than a standard belt.

4. A method as set forth in claim 1 in which said step of detachably fastening comprises fastening at least one ring in said mold having one surface in the form of a toothed surface which enables forming an associated belt having a corresponding toothed surface.

5. A method as set forth in claim 1 in which said forming step comprises forming a plurality of oval cavities in said mold having equal lengths and being arranged in side by side relation to thereby enable the simultaneous making of a corresponding plurality of individual belts having equal lengths.

6. A method as set forth in claim 5 in which said forming step comprises forming said plurality of oval cavities substantially in the same plane.

7. A method as set forth in claim 1 in which said forming step comprises forming a plurality of concentric cavities in said mold having different lengths to thereby enable the simultaneous making of a corresponding plurality of individual belts having different lengths each corresponding in length to its associated cavity.

8. A method as set forth in claim 7 in which said forming step comprises forming said plurality of concentric cavities substantially in the same plane.

9. A method as set forth in claim 1 in which said forming step comprises forming a plurality of sets of cavities in said mold, said sets of cavities being arranged in side-by-side relationship and each set comprising a plurality of concentric cavities.

* * * * *